(12) United States Patent
Gennasio

(10) Patent No.: US 7,591,488 B2
(45) Date of Patent: Sep. 22, 2009

(54) FITTING PARTICULARLY FOR HIGH-PRESSURE PIPES

(75) Inventor: Enrico Gennasio, Vinercate (IT)

(73) Assignee: Alfagomma, S.p.A., Milan (IT)

( * ) Notice: Subject to any disclaimer, the term of this patent is extended or adjusted under 35 U.S.C. 154(b) by 255 days.

(21) Appl. No.: 10/590,764

(22) PCT Filed: Jan. 18, 2005

(86) PCT No.: PCT/EP2005/000426

§ 371 (c)(1),
(2), (4) Date: Aug. 24, 2006

(87) PCT Pub. No.: WO2005/080851

PCT Pub. Date: Sep. 1, 2005

(65) Prior Publication Data

US 2007/0052233 A1 Mar. 8, 2007

(30) Foreign Application Priority Data

Feb. 25, 2004 (IT) ...................... MI2004A000320

(51) Int. Cl.
*F16L 19/00* (2006.01)
(52) U.S. Cl. ................................... 285/354
(58) Field of Classification Search ............. 285/354, 285/386
See application file for complete search history.

(56) References Cited

U.S. PATENT DOCUMENTS

| | | | | |
|---|---|---|---|---|
| 2,131,509 A * | 9/1938 | Donahue et al. | ............. | 285/347 |
| 3,092,404 A * | 6/1963 | MacWilliam | ............ | 285/334.4 |
| 3,393,930 A * | 7/1968 | Ziherl | ...................... | 285/334.4 |
| 3,853,339 A * | 12/1974 | Wilson | ..................... | 285/135.4 |
| 4,575,134 A * | 3/1986 | Sugano | ........................ | 285/353 |
| 5,169,180 A * | 12/1992 | Villoni et al. | ................. | 285/53 |
| 5,192,095 A * | 3/1993 | Behrens | .................... | 285/332.1 |
| 5,570,603 A | 11/1996 | Chatterley et al. | | |
| 5,735,553 A * | 4/1998 | Niemiec | ...................... | 285/101 |
| 5,887,912 A * | 3/1999 | Nakamura | ............... | 285/334.5 |
| 5,893,591 A | 4/1999 | Ebel et al. | | |
| 6,431,613 B1 * | 8/2002 | Altenrath et al. | ............ | 285/354 |
| 6,527,304 B1 * | 3/2003 | Pliassounov | ................ | 285/354 |
| 7,000,953 B2 * | 2/2006 | Berghaus | .................... | 285/354 |

FOREIGN PATENT DOCUMENTS

FR 1 141 975 9/1957
GB 453 217 3/1936

* cited by examiner

*Primary Examiner*—David E Bochna
(74) *Attorney, Agent, or Firm*—Andrew Wilford

(57) ABSTRACT

A pipe end centered on an axis is formed with a radial outward enlargement having an axially inwardly directed face lying in a plane perpendicular to the axis. An annular reinforcement fitted in the enlargement is braced radially outwardly thereagainst and has an axially outwardly directed front end face lying in a plane perpendicular to the axis and axially outward of the inwardly directed enlargement face. A nut bears axially outwardly on the axially inwardly directed enlargement face. A connector engaged by the nut is pressed thereby axially inward against the axially outwardly directed reinforcement face.

11 Claims, 3 Drawing Sheets

FITTING PARTICULARLY FOR HIGH-PRESSURE PIPES

CROSS REFERENCE TO RELATED APPLICATIONS

This application is the US national phase of PCT application PCT/EP2005/000426, filed 18 Jan. 2005, published 1 Sep. 2005 as WO2005/080851, and claiming the priority of Italian patent application MI2004A000320 itself filed 25 Feb. 2004, whose entire disclosures are herewith incorporated by reference.

FIELD OF THE INVENTION

The present invention refers to a fitting particularly for high-pressure pipes.

BACKGROUND OF THE INVENTION

As known, there are numerous types of fittings for a wide variety of uses. In particular, fittings for high-pressure pipes suitable for use on industrial construction machines, such as earth-moving machines or lifting machines and the like, must be able to be assembled easily, also on a building site, and ensure an excellent seal together with good strength and long life.

Normally, the known fittings have a nut suitable for hydraulic connection with a connection element, which can be a pipe union or similar that is held at the end of the high-pressure pipe through an additional element, which can be a ring fixed integrally to the end of the pipe. Retention of the ring to the pipe is made essentially by bending the end of the pipe by about 90° so as to form a small collar, obtained by squashing of the material, which prevents the ring from slipping off the pipe and consequently also from the nut.

This technical solution, for example, has the drawback that the small collar that is not as thick as the walls of the pipe, forming a weak point thereof. Moreover, the ring must be slotted onto the pipe at a specific spacing from its end to be bent, making such an operation complex. Moreover, the ring must also be held radially by the pipe, otherwise it tends to slip off both due to the operating pressure and when the nut is tightened. Last but not least, the particular squashing processing by dragging of the small collar means that its front surface has an uncontrolled degree of roughness that could compromise the seal with the gasket with which it is associated.

OBJECTS OF THE INVENTION

The object of the invention is eliminating the aforementioned drawbacks of the prior art.

In this technical task an important further object of the invention is to devise a fitting that has the front surface in contact with the sealing gasket and that has a predetermined degree of roughness such as to optimize the fluid-dynamic seal.

Yet another object of the invention is to make a fitting that prevents the possible slipping of the connection nut in time and that can have its front surface treated to increase its mechanical hardness.

The last but not least object of the invention is to make a fitting in which the front surface has the same thickness as the wall of the pipe or even a greater thickness and that also allows the vibrations caused by its use in particular fields of use to be dampened.

SUMMARY OF THE INVENTION

This and other objects are attained by a fitting particularly for high-pressure pipes, characterized in that it comprises means for holding a nut at the end of a high-pressure pipe defined by at least one deformation of the walls of the end zone of the pipe and reinforcement for keeping the deformation substantially unaltered.

BRIEF DESCRIPTION OF THE DRAWING

Further characteristics and advantages of the invention shall become clearer from the description of a preferred but not exclusive embodiment of the fitting particularly for high-pressure pipes, according to the invention, for illustrative and not limiting purposes in the attached drawings, in which.

SPECIFIC DESCRIPTION

Figure 2:
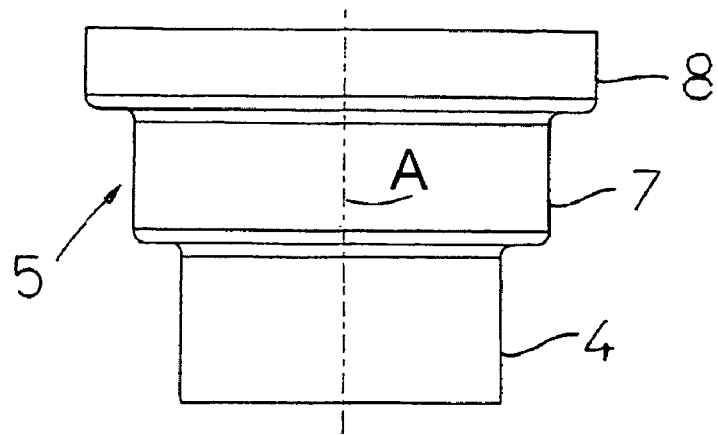
FIG. 2 is a top side elevational view of the end of the pipe according to the invention.
Figure 1:
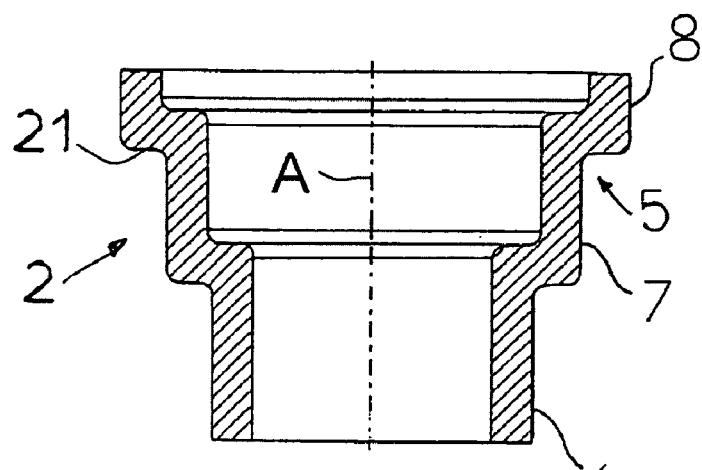
FIG. 1 is a top side section view of the end of the deformed pipe according to the invention.

With particular reference to the figures described above, the fitting particularly for high-pressure pipes according to the invention, generally indicated with reference numeral 1, comprises means, generally indicated with reference numeral 2, for holding a nut 3 at the end of a high-pressure pipe 4.

The holding means 2 are defined by at least one deformation 5 of the walls of the end of the pipe 4.

Moreover, there is a reinforcement or reaction means, generically indicated with 6, for keeping the obtained deformation 5 substantially unaltered. In particular, the deformation 5 comprises various enlargements extending annularly on the end of the pipe 4 with different sized diameters and more precisely it comprises first and second enlargements 7 and 8, the latter having a greater diameter than the former.

Figure 3:
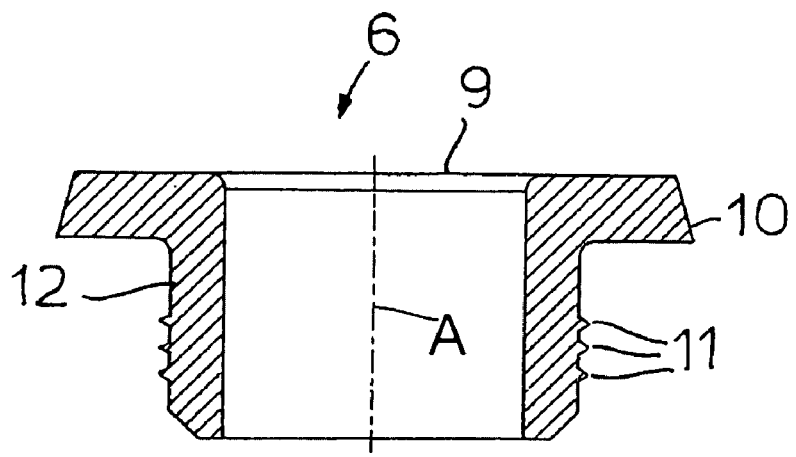
FIG. 3 is a top side section view of the cap according to the invention.
Figure 4:
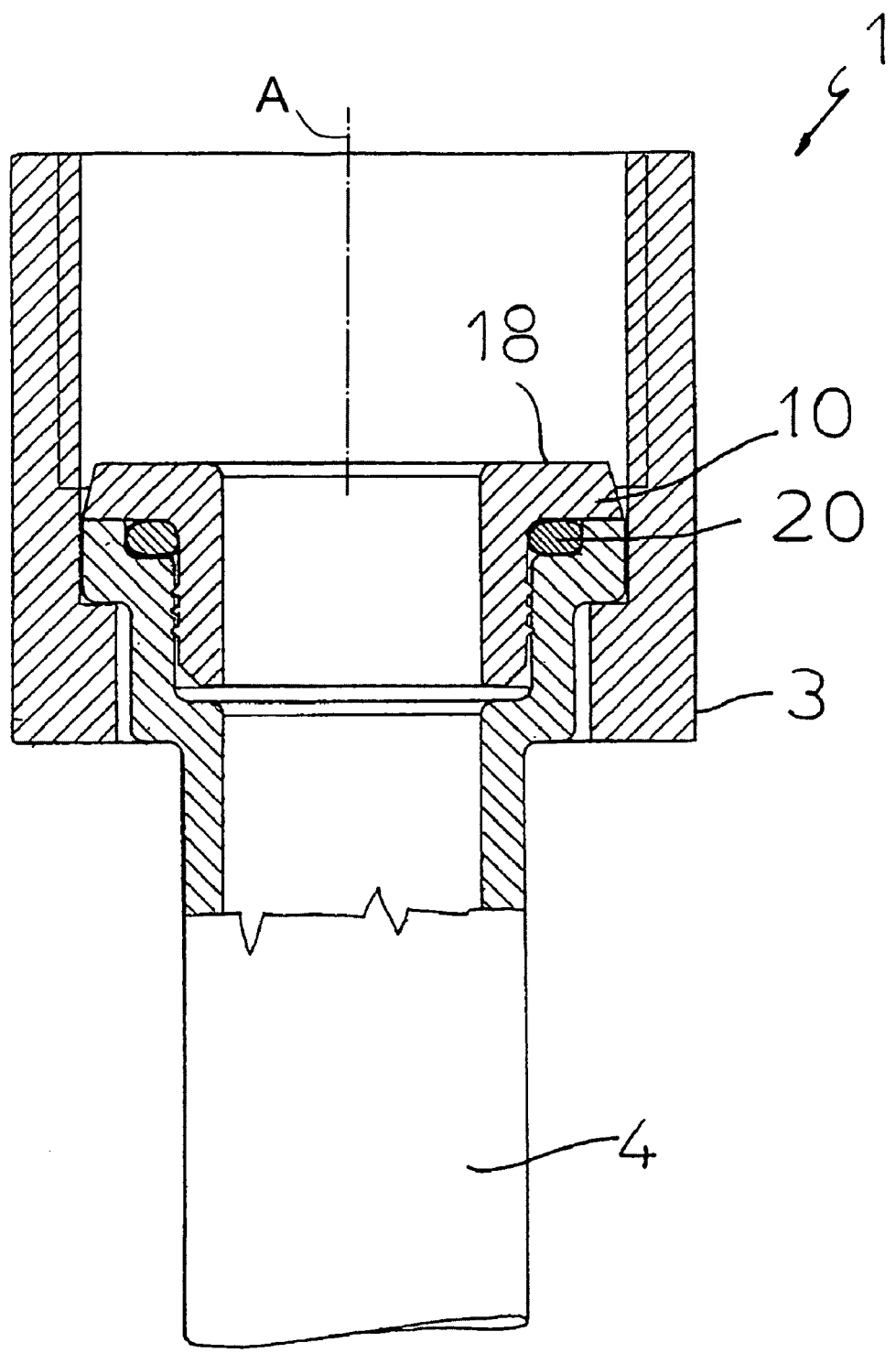
FIG. 4 is a top side section view of the pipe with the cap according to the invention.

In a first embodiment shown in FIGS. 3 and 4 the reinforcement 6 comprises a cap 9 having a flaring head 10 and at least one annular rib 11, and more precisely three ribs 11 formed on its cylindrical body 12 and engaged on the radially inwardly directed surface of the first enlargement 7. The three ribs 11, as well as holding the cap inside the pipe, also make a fluid-sealing barrier.

Figure 5:
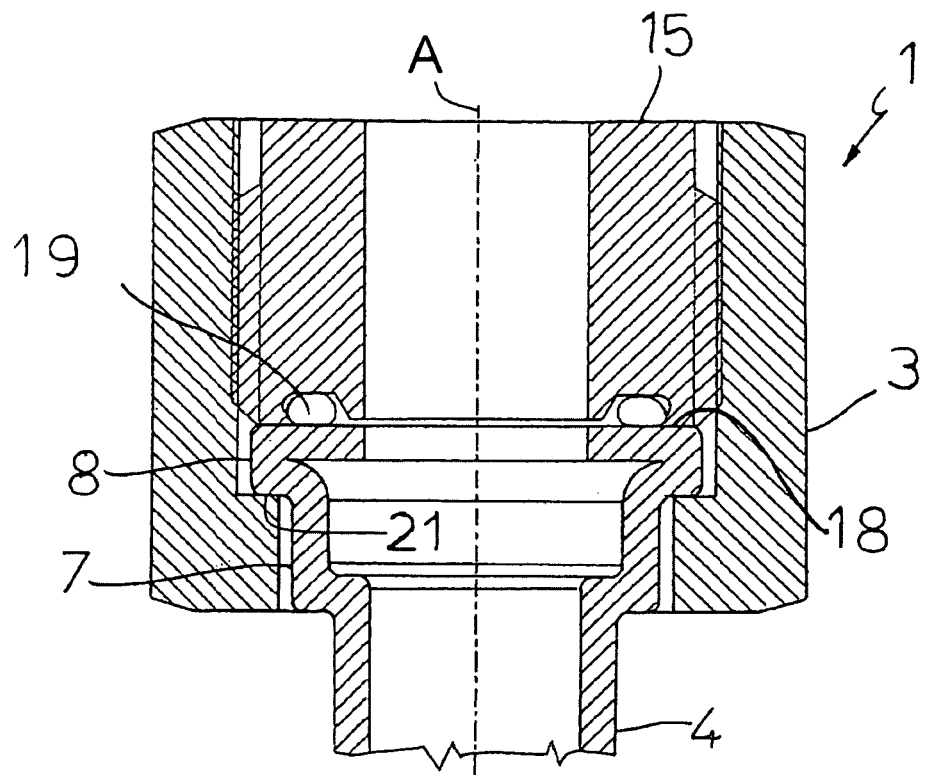
FIG. 5 is a top side section view of the pipe with the first bend according to the invention.
Figure 6:
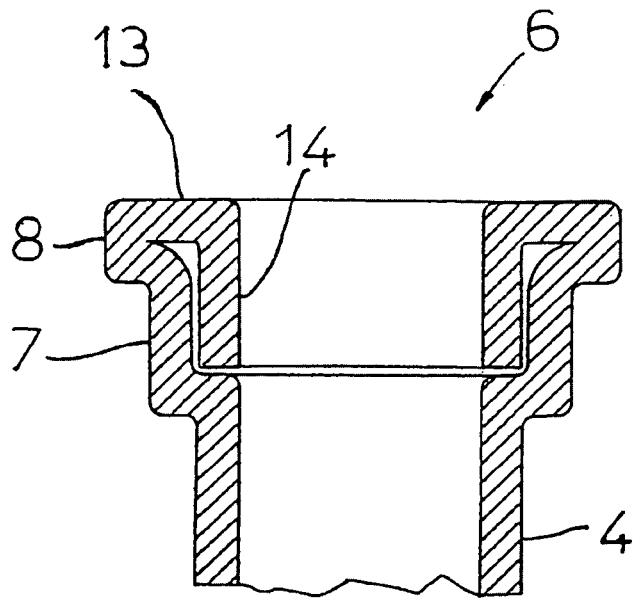
FIG. 6 is a top side section view of the pipe with the second bend according to the invention.

In a second embodiment shown in FIGS. 5 and 6, the reinforcement 6 comprises a first bend 13 extending radially with respect to the deformation 5. The first bend 13 has, in a variant embodiment, a second bend 14 extending parallel to the axis A of the pipe 4. Advantageously, the first and second bend 13 and 14 define a reinforcement for the first and second enlargements 7 and 8.

Indeed, the presence of the first bend 13 or of the cap 9 on the end of the pipe 4 allow the deformation 5 and in particular the configuration of the first and second enlargements 7 and 8 to remain unaltered when the nut 3 is screwed onto a connection element 15, which can, for example, be a pipe union or similar threaded connector.

The nut 3, indeed, screwing with the connection element 15 going into abutment against an axially inwardly directed face 21 lying in a plane perpendicular to the axis A and formed on the second enlargement 8 would tend to deform it without either the cap 9 or the first bend 13. The fitting also has engagement means, indicated with 18, with a first sealing gasket 19 with the connection element 15. The engagement means are arranged at the front end of the pipe and are respectively defined by an axially outwardly directed front face of the head 10 of the cap or by the front surface of the first bend 13, this face lying in a plane perpendicular to the axis A.

Thanks to this solution it is possible to fine-machine the surface in contact with the gasket 19 so as to obtain a perfect seal with it (controlled roughness). For example, the front surface of the cap, as well as having a greater thickness with respect to the walls of the pipe, can also be subjected to heat treatment so as to increase its hardness.

In the case of use of the cap 9, the fitting has second engagement means with a second gasket 20. In particular, the second engagement means are defined by the inner seat determined by the second enlargement 8 suitable for housing the second gasket 20 that engages with the head 10 of the cap 9.

In this way a further advantage is obtained determined by the presence on the fitting of two gaskets 19 and 20 that damp vibrations from the connection element to the pipe and vice-versa above all if mounted on industrial construction equipment, as is usually the case.

Also forming the object of the present invention is a process for making a fitting particularly for high-pressure pipes that consists of slotting the nut 3 in the pipe 4 and radially deforming the end zone of the pipe through a rotary tool movable axially and radially. This way, the reinforcement are made for keeping the deformation substantially unaltered when subjected to the pulling force of the nut when it is associated with a connection element.

In particular, the making of the reinforcement consists of introducing a cap into the end of the pipe or of making a bend radially to the pipe.

The invention thus conceived can undergo numerous modifications and variants, all of which are covered by the inventive concept; moreover, all of the details can be replaced with technically equivalent elements.

In practice, the materials used, as well as the sizes, can be whatever according to the requirements and the state of the art.

The invention claimed is:

1. A fitting comprising:
   a pipe end centered on an axis and formed with a radial outward enlargement having an axially inwardly directed face lying in a plane perpendicular to the axis;
   an annular reinforcement fitted in the enlargement, braced radially outwardly thereagainst and having an axially outwardly directed front end face lying in a plane perpendicular to the axis and axially outward of the inwardly directed enlargement face;
   a nut bearing axially outwardly on the axially inwardly directed enlargement face;
   a connector engaged by the nut and pressed thereby axially inward against the axially outwardly directed reinforcement face; and
   a first sealing gasket at the front end face.

2. The fitting according to claim 1 wherein the pipe end has two such enlargements extending annularly on said end of said pipe with different sized diameters.

3. A fitting comprising:
   a pipe end centered on an axis and formed with a radial outward enlargement having an axially inwardly directed face lying in a plane perpendicular to the axis;
   an annular reinforcement fitted in the enlargement, braced radially outwardly thereagainst and having a first radially extending bend forming an axially outwardly directed front end face lying in a plane perpendicular to the axis and axially outward of the inwardly directed enlargement face and a second bend;
   a nut bearing axially outwardly on the axially inwardly directed enlargement face;
   a connector engaged by the nut and pressed thereby axially inward against the axially outwardly directed reinforcement face; and
   a second enlargement having a greater diameter than the first-mentioned enlargement, said first and second bend reinforcing said first and second enlargements.

4. The fitting according to claim 3, further comprising second engagement means defined by said second enlargement having, inside said pipe, an annular seat; and
   a second sealing gasket with the head of said cap on the seat.

5. The fitting according to claim 3 wherein said nut abuts against said second enlargement.

6. A fitting comprising:
   a pipe end centered on an axis and formed with two radial outward enlargements extending annularly on the pipe end, of different sized diameters, and each having an axially inwardly directed face lying in a plane perpendicular to the axis;
   an annular reinforcement fitted in the enlargement, braced radially outwardly thereagainst and having an axially outwardly directed front end face lying in a plane perpendicular to the axis and axially outward of the inwardly directed enlargement face;
   a nut bearing axially outwardly on the axially inwardly directed enlargement face; and
   a connector engaged by the nut and pressed thereby axially inward against the axially outwardly directed reinforcement face.

7. The fitting according to claim 6 wherein the reinforcement is a cap having a flaring head forming the outwardly directed reinforcement face and a cylindrical body having at least one annular radially projecting rib.

8. The fitting according to claim 7 wherein said cylindrical body of said cap comprises at least three ribs engaged on the inner surface of said first enlargement.

9. The fitting according to claim 6 wherein the reinforcement has a first bend extending radially.

10. The fitting according to claim 6 wherein the reinforcement has a second bend extending parallel to the axis.

11. The fitting defined in claim 6 wherein the nut and connector are formed with interengaging screwthreads.

* * * * *